No. 717,655. PATENTED JAN. 6, 1903.
R. T. ASTLE.
COOKING UTENSIL.
APPLICATION FILED AUG. 14, 1902.
NO MODEL.

Witnesses
F. A. Barron
N. I. Culley

Inventor
Richard T. Astle
by Milo B. Stevens & Co.
Attorneys

UNITED STATES PATENT OFFICE.

RICHARD T. ASTLE, OF GROVER, WYOMING.

COOKING UTENSIL.

SPECIFICATION forming part of Letters Patent No. 717,655, dated January 6, 1903.

Application filed August 14, 1902. Serial No. 119,640. (No model.)

*To all whom it may concern:*

Be it known that I, RICHARD T. ASTLE, a citizen of the United States, residing at Grover, in the county of Uinta and State of Wyoming, have invented certain new and useful Improvements in Cooking Utensils; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to cooking utensils, and comprises a false bottom for culinary vessels, having for its object to prevent the food on being cooked from burning or adhering to the bottom of the vessel.

A further object is to provide a simple and cheap device of this character.

Figure 1:
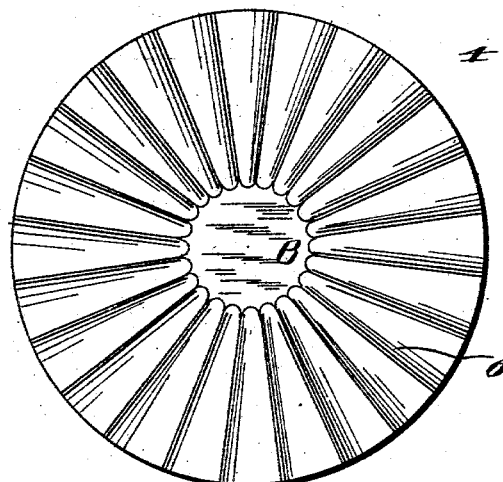
Figure 2:
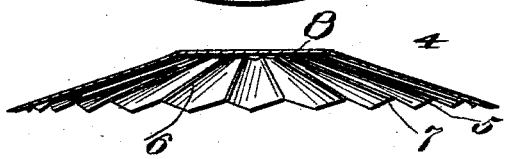
Figure 3:
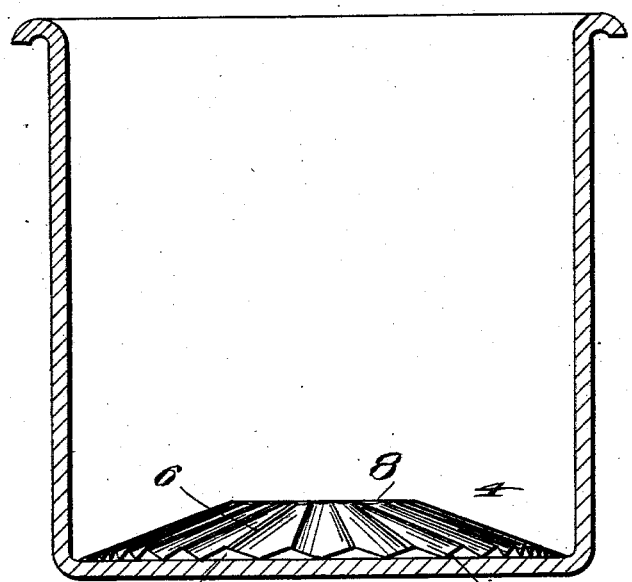

In the drawings, Figure 1 is a top plan view. Fig. 2 is a vertical section. Fig. 3 is a vertical section of an ordinary culinary vessel, showing my device in proper position therein.

Referring specifically to the drawings, my device is indicated at 4 and comprises a frusto-conical plate, the lower base 5 of which rests on the bottom of the vessel, as shown in Fig. 3. The sides are corrugated or crimped, as at 6, by which openings 7 are provided between the plate and the bottom of the vessel in which it is placed. These openings are for the purpose of permitting water to circulate under the plate. The article to be cooked is placed on the upper base 8.

It will be seen that my device is extremely simple in its construction and inexpensive to manufacture. It may be readily cleaned when necessary, as all its parts are accessible.

Having thus described my invention, what is claimed as new, and desired to be secured by Letters Patent, is—

A false bottom for culinary vessels comprising an imperforate frusto-conical plate, adapted to rest on the bottom of the vessel, the sides of said plate being formed with corrugations providing openings between said plate and the bottom of the vessel, substantially as shown and described.

In testimony whereof I affix my signature in presence of two witnesses.

RICHARD T. ASTLE.

Witnesses:
    MARK HURD,
    GEORGE OSMOND.